United States Patent [19]
Kobres, Jr.

[11] 4,014,369
[45] Mar. 29, 1977

[54] TRIPLE PIPE LOW TEMPERATURE PIPELINE

[75] Inventor: Adolph Kobres, Jr., Glen Rock, N.J.

[73] Assignee: Exxon Research and Engineering Company, Linden, N.J.

[22] Filed: Dec. 31, 1975

[21] Appl. No.: 645,676

[52] U.S. Cl. .............................. 138/112; 138/113; 138/114; 138/149; 138/153; 138/175
[51] Int. Cl.² ........................................ F16L 9/00
[58] Field of Search .......... 138/111, 149, 112, 113, 138/114, 115, 116, 117, 140, 153, 172–178

[56] References Cited
UNITED STATES PATENTS

| | | | |
|---|---|---|---|
| 2,875,987 | 3/1959 | Valley | 138/112 X |
| 3,113,595 | 10/1963 | Cotman, Jr. | 138/113 |
| 3,388,724 | 6/1968 | Mowell et al. | 138/149 |

*Primary Examiner*—Houston S. Bell, Jr.
*Attorney, Agent, or Firm*—F. Donald Paris

[57] ABSTRACT

A pipeline system for low temperature liquid or hot gas/vapor transfer including a triple pipe arrangement wherein the low temperature liquid or hot gas/vapor is transferred through an inner pipe with a vapor or condensate return respectively being provided by an annulus between the inner pipe and a middle pipe. Thermal insulation is situated in the annulus between the middle pipe and the outer casing or pipe and the outer casing is welded to the inner double pipe system at ambient temperature in order to restrain any thermal movement of the inner pipes during cooldown or heatup to operating temperature.

9 Claims, 3 Drawing Figures

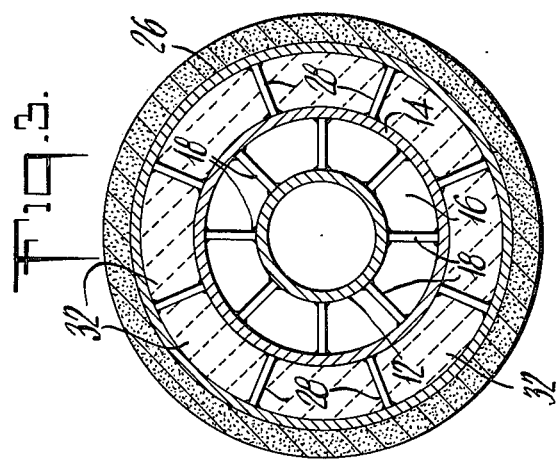
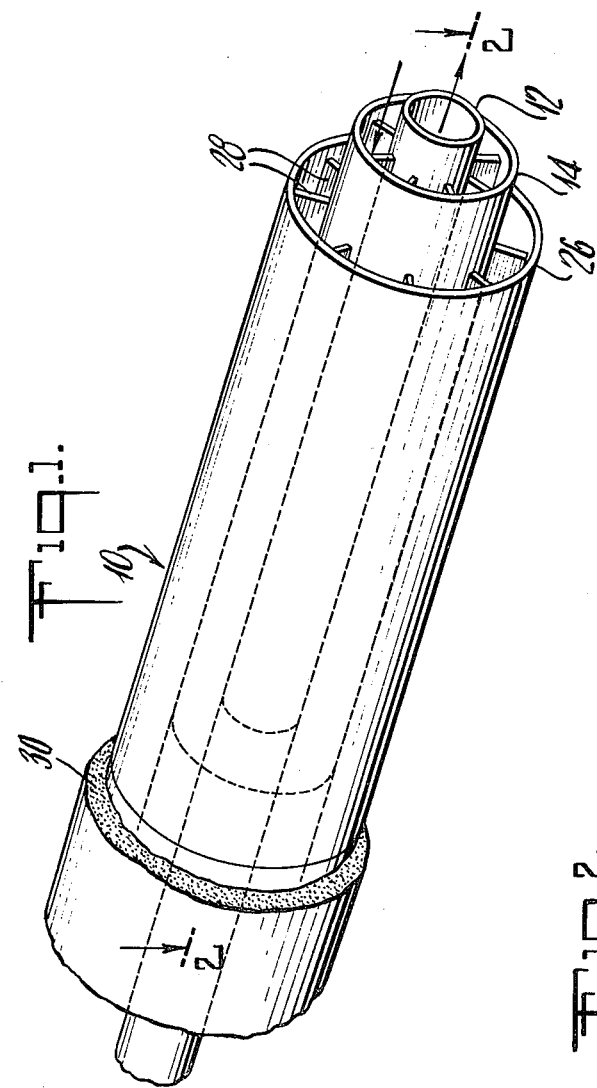
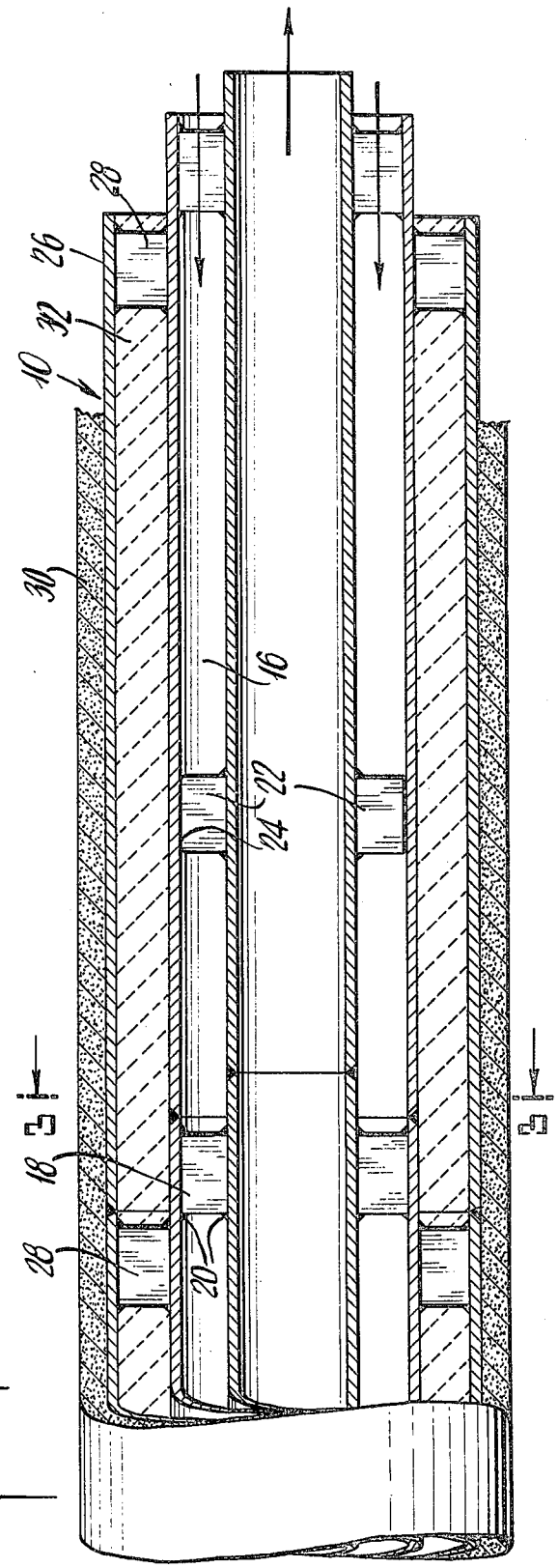

TRIPLE PIPE LOW TEMPERATURE PIPELINE

BACKGROUND OF THE INVENTION

It is common in the transfer of low temperature liquids through pipelines, for example, in the transport of products such as propane (−56° F.), butane (+28° F.), ethylene (−160° F.), or LNG (−260° F.), all of which are characterized by low temperatures, to employ a single insulated pipeline for the transfer of the low temperature liquid and a physically separate vapor return line in which the vapor resulting from boiloff from and displacement in the receiving vessel is returned to the storage tank or sphere. A typical conventional low temperature liquid pipeline system which would require separate vapor return facilities is found in U.S. Pat. No. 3,693,665. Reference also may be made to API 2510 and NFPA 59A for further details with respect to conventional systems presently contemplated and used. Such conventional arrangements present the problems of accommodating or restraining the large thermal movements assocaited with cooldown of the liquid pipeline, adequately insulating the liquid pipeline excessive heat leak into the cold liquid, and satisfying space requirements for two separate pipelines rather than only in existing facilities where available space may be limited.

SUMMARY OF THE INVENTION

The present invention relates to a pipeline system for transfer of cold liquids or hot gases/vapors, which system includes a triple pipe arrangement wherein the inner pipe carries the product and a vapor or condensate return is provided by means of an annulus provided between the inner and middle pipes. Insulation is disposed between the middle pipe and outer casing, which insulation maintains the outer casing at near ambient temperature during cooldown or heatup of the inner pipe to operating temperature. The inner double pipe is anchored to the outer casing at regular intervals. When necessary, this anchorage may be utilized to initially prestress the pipeline assembly to preclude thermal overstress of the inner pipe that would otherwise be developed during cooldown or heatup. Such a design eliminates the need for a separate vapor or condensate return system, reduces thermal movement of the pipes, and reduces insulation thickness required because of the insulating effect credited from the return annulus to the insulation provided. More particularly, the outer casing is welded to the inner double pipes at ambient conditions and at regular intervals which restrains the thermal movement of the inner pipes when they are cooled or heated from ambient temperature to the temperature of the product being transferred, prior to placing the system in operation for product transfer.

The advantages which this system provides over the conventional single pipe system and recently developed restrained double pipe systems is not only that there is the complete elimination of a separate vapor or condensate return system, except possibly at the terminals, but also a corresponding reduction is obtained in insulation thickness. This is so because the insulating benefit of the return annulus reduces the normally required insulation thickness. Also, for cold liquid transfer only, because of the use of the annulus for vapor return, there is a reduction in the transverse area requirement of the vapor return line or a corresponding reduction in the pumping head required for vapor return because of the heat transfer from the return vapor to the cold liquid through the inner pipe wall. Thus, the cooling action of the cold liquid carrier pipe on the mean temperature of the annular vapor return passage will result in a higher average vapor density over the full vapor return run than heretofore experienced when using a separate vapor return system. This means that piping friction losses associated with a given weight flow rate of vapor will be reduced, permitting the use of either a smaller middle pipe or smaller pumps and drivers. Finally, there is a reduction in the material grade requirements for any anchorages and/or transition sections between the outer carrier or middle pipe and the casing. The temperature gradient through the return annulus produces a higher wall temperature at the middle pipe than that obtained at the wall in the case of a single product carrier pipe with a separate return pipe, since the product is not in direct contact with the middle pipe in the present triple pipe system. Therefore, the temperature range of the product which affects the grade (i.e., metallurgical composition per ASTM specifications) of material required at each anchorage/transition section (i.e., connectors between outer casing and carrier pipes) can be correspondingly extended for each material grade.

These and other advantages, as well as the nature, construction, arrangement and operation of the present invention will be apparent upon consideration of the illustrated embodiment described in detail herein in connection with the accompanying drawings.

BRIEF DESCRIPTION OF THE DRAWINGS

FIG. 1 is a perspective view of the triple pipe system having a concrete outermost layer thereabout (shown in part), in accordance with the present invention;

FIG. 2 is a longitudinal cross-sectional view taken substantially along the line 2—2 of FIG. 1; and FIG. 3 is a radial cross-sectional view taken substantially along the line 3—3 of FIG. 2.

DESCRIPTION OF THE PREFERRED EMBODIMENT

Referring now to the drawings wherein like reference numerals are used throughout the several view to designate the same parts, there is shown in FIG. 1 a typical section 10 of a pipeline constructed in accordance with the present invention. The section 10 comprises an inner pipe 12, which is made of a suitable alloy or carbon steel or other appropriate material (e.g., aluminum alloy, nickel alloy) which carries a low temperature liquid that typically comprises butane, propane, other liquefied petroleum gas or liquefied natural gas. Surrounding the inner pipe 12 in coaxial relation therewith is a middle pipe 14 which is radially spaced from the inner pipe to provide an annulus 16 therebetween. The annulus 16 functions as a return passageway for vapor produced by boiloff from and displacement in the receiving vessel (not shown). The middle pipe 14 is secured to the inner pipe 12 by means of longitudinally and axially spaced radial ribs 18, which are made of metal plate, welded at opposite radial ends thereof as shown at 20 to the inner and middle pipes 12 and 14 for securing them togehter to provide anchorage and buckling resistance. The ribs preferably are provided at the end of each typical pipe section 10, although an additional rib group or groups can be provided along the length if needed for extra support or restraint against buckling. Thus, depending on the selected length of each pipe section, an intermediate buckling restraint rib group 22 can be required for the inner pipe. Since the inner pipe is under compression only under ambient condition when initial prestress is provided, for example, by jacking the inner double pipe against the outer casing pipe prior to welding in the end anchor ribs, the intermediate buckling restraint members or ribs 22 can be provided in the annulus 16 welded only to the inner pipe 12, with the outer radial end being free with respect to the adjacent middle pipe 14. The width of the particular rib is such as to provide a sliding fit against the inner face of the middle pipe as shown in 24.

An outer casing or pipe 26, also made of carbon steel or other appropriate material, is joined to the middle pipe 14 at the end of each section 10 by a similar welded rib structure 28, which is essentially the same as the ribs 18 disposed between the inner and middle pipes. While a grouping of eight ribs 28 is shown, the number employed and spacing will depend on the magnitude of the anchor loads to be transmitted between the inner double pipe and outer casing. Other alternate anchorage mechanisms for securing the outer casing to the inner double pipe may comprise transition cones or similar full end closures which serve to compartmentalize insulation as well as transmit anchor loads. If the pipeline comprising a plurality of the sections 10 serves as a submarine line, i.e., underwater, it may be necessary to provide an outer anti-buoyancy concrete layer. This will depend on the particular pipe bedding technique selected and the buoyancy calculations. The layer will be used when the factor of safety against uplift is insufficient, or where additional protection of the pipeline from impact damage (e.g. from ship's anchors) is deemed necessary. This is shown as concrete layer 30 in FIG. 2.

Between the outer casing 26 and the middle pipe 14 is insulation 32, which is of the low temperature type, e.g., polyurethane foam. The insulating fills the outer annulus and functions to prevent compression buckling of the middle pipe or casing pipe, whichever is in compression, as well as to minimize heat leak into the cold inner double pipe fluids. Other insulation for high temperature applications also may be used.

Each of the assembled pipe sections can be prestressed at ambient conditions, which are those conditions of the surrounding environment, to minimize the maximum thermal stress subsequently developed when the product is flowing therethrough which further lowers the temperature to that of the product flowing. The outer casing and the concrete layer, if provided, act as a unit to restrain the thermal movement of the inner pipes during cooldown, that is, any movement tending to contract the pipes and make them shorter. The compression buckling in the direction perpendicular to the longitudinal pipeline axis, of either the casing or middle pipe, is prevented by means of the lateral restraint provided through the insulating layer from the tension member to the compression member. Further buckling resistance for the inner pipe 12 is provided by means of radial ribs 18 at the ends of the assembled sections. As discussed heretofore, additional intermediate buckling restraints such as the ribs 22 can be provided.

Other alternatives and/or modifications of the present invention include high temperature applications with hot gases/vapors in the inner carrier pipe and warm condensate in the return annulus, with high temperature insulation (instead of low temperature insulation) in the outer annulus between the middle pipe and outer casing.

While a preferred embodiment of the present invention has been shown and certain variations mentioned, further modifications and variations in the construction and/or arrangement of the invention may present themselves to those skilled in the art upon a reading and consideration of this disclosure. It is intended that such variations and/or modifications fall within the scope of the present invention which is better defined by reference to the appended claims.

What is claimed is:

1. A pipe section for use in a pipeline system comprising: a first pipe, a second pipe radially-spaced from said first pipe in coaxial relation and connected therewith to define a first annulus therebetween, a third pipe connected in coaxial radially-spaced relation with said second pipe for restraining movement thereof and defining a second annulus therebetween, radial rib means connected between said first and second pipes and between said second and third pipes respectively, for interlocking said coaxial pipes to minimize thermal movement of said system and substantially eliminate axial differential thermal movement between said pipes, and insulation means disposed in said second annulus.

2. The pipe section of claim 1 wherein said rib means are connected to said first and second pipes and said second and third pipes respectively, at the end of said pipe section in axially spaced relationship.

3. The pipe section of claim 1 including intermediate rib means radially disposed between said first and second pipes, said intermediate rib means connected to at least one of said first and second coaxial pipes for preventing transverse radial buckling of said second pipe.

4. The pipe section of claim 3 wherein said intermediate rib means is connected at only one radial end thereof to said first pipe and at the opposite radial end thereof is in sliding relationship with said second pipe.

5. The pipe section of claim 1 including a concrete layer secured to an surrounding said third pipe.

6. A triple pipe counter flow system for use in a pipeline comprising: an inner pipe, a middle pipe and an outer casing all in coaxial relationship relative to each other, said middle pipe being radially spaced from said inner pipe and secured thereto by means of a first plurality of radial ribs for preventing relative axial movement between said pipes, said outer casing being radially spaced from said middle pipe and secured thereto by means of a second plurality of radial ribs for preventing relative axial movement therebetween, insulation means disposed in the radial spacing between said middle pipe and said outer casing, said first and second plurality of radial ribs being secured at opposite radial ends thereof to said pipes and said outer casing, thereby substantially eliminating differential axial thermal movement between said inner and middle pipes and said outer casing.

7. The pipe system of claim 6 wherein said first and second plurality of radial ribs are peripherally spaced between said inner pipe and said middle pipe and between said middle pipe and said outer casing.

8. The pipe system of claim 6 including additional rib means between said middle pipe and said inner pipe for preventing radial buckling of said middle pipe.

9. The pipe system of claim 7 wherein each of said first and second radial ribs are located between adjacent ones of said second and first radial ribs, respectively.

* * * * *